US011799329B2

(12) United States Patent
Jadidian et al.

(10) Patent No.: US 11,799,329 B2
(45) Date of Patent: *Oct. 24, 2023

(54) SHIELDING FOR MULTI-COIL WIRELESS POWER TRANSFER SYSTEMS (71) Applicant: Apple Inc., Cupertino, CA (US)

(72) Inventors: Jouya Jadidian, Saratoga, CA (US); Vaneet Pathak, Los Altos, CA (US); Martin Schauer, Fremont, CA (US); Cheung-Wei Lam, San Jose, CA (US); Darshan R. Kasar, San Francisco, CA (US); Christopher S. Graham, San Francisco, CA (US); Andro Radchenko, San Jose, CA (US)

(73) Assignee: Apple Inc., Cupertino, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 17/096,788

(22) Filed: Nov. 12, 2020

(65) Prior Publication Data

US 2021/0065965 A1 Mar. 4, 2021

Related U.S. Application Data

(63) Continuation of application No. 15/658,227, filed on Jul. 24, 2017, now Pat. No. 10,840,007.

(51) Int. Cl.
*B60L 53/63* (2019.01)
*B60L 53/67* (2019.01)
(Continued)

(52) U.S. Cl.
CPC .......... *H02J 50/70* (2016.02); *H01F 27/2885* (2013.01); *H01F 27/36* (2013.01);
(Continued)

(58) Field of Classification Search
CPC .......... H02J 50/70; H02J 50/10; H02J 50/402; H01F 27/2885; H01F 27/36; H01F 27/366; H01F 38/14
See application file for complete search history.

(56) References Cited

U.S. PATENT DOCUMENTS

| 2012/0112552 A1* | 5/2012 | Baarman | H02J 50/10 |
| | | | 307/104 |
| 2015/0102892 A1* | 4/2015 | Yeo | H02J 50/70 |
| | | | 336/200 |
| 2017/0084991 A1 | 3/2017 | Mayo | |

OTHER PUBLICATIONS

"Final Office Action," dated Oct. 17, 2019 in U.S. Appl. No. 15/658,227. 16 pages.

(Continued)

*Primary Examiner* — Elim Ortiz
(74) *Attorney, Agent, or Firm* — KILPATRICK TOWNSEND & STOCKTON LLP (57) ABSTRACT

A shield for redirecting magnetic field generated from a plurality of transmitter coils includes a ferromagnetic structure divided into segments by a plurality of boundary regions, each segment comprises a first material having a first magnetic permeability and each boundary region comprises a second material having a second magnetic permeability lower than the first magnetic permeability, where the plurality of boundary regions are configured to resist a propagation of magnetic field from a first area of the ferromagnetic structure to a second area of the ferromagnetic structure, where the first area intercepts the magnetic field generated from at least one active transmitter coil of the plurality of transmitter coils.

20 Claims, 7 Drawing Sheets

(51) Int. Cl.
  *B60L 7/00*   (2006.01)
  *H02J 50/70*  (2016.01)
  *H01F 27/28*  (2006.01)
  *H02J 50/10*  (2016.01)
  *H01F 38/14*  (2006.01)
  *H01F 27/36*  (2006.01)
  *H02J 50/40*  (2016.01)

(52) U.S. Cl.
  CPC ........... *H01F 27/366* (2020.08); *H01F 38/14* (2013.01); *H02J 50/10* (2016.02); *H02J 50/402* (2020.01)

(56) References Cited

OTHER PUBLICATIONS

"Non-Final Office Action," dated May 1, 2019 in U.S. Appl. No. 15/658,227. 12 pages.
"Notice of Allowance," dated Jul. 23, 2020 in U.S. Appl. No. 15/658,227. 9 pages.

* cited by examiner

SHIELDING FOR MULTI-COIL WIRELESS POWER TRANSFER SYSTEMS

CROSS-REFERENCES TO RELATED APPLICATIONS

This application is a continuation of U.S. application Ser. No. 15/658,227, filed Jul. 24, 2017, the disclosure of which is incorporated by reference.

BACKGROUND

Electronic devices (e.g., mobile phones, media players, electronic watches, and the like) operate when there is charge stored in their batteries. Some electronic devices include a rechargeable battery that can be recharged by coupling the electronic device to a power source through a physical connection, such as through a charging cord. Using a charging cord to charge a battery in an electronic device, however, requires the electronic device to be physically tethered to a power outlet. Additionally, using a charging cord requires the mobile device to have a connector (e.g., a receptacle connector) configured to mate with a connector (e.g., a plug connector) of the charging cord. The receptacle connector typically includes a cavity in the electronic device that provides an avenue within which dust and moisture can intrude and damage the device. Furthermore, a user of the electronic device has to physically connect the charging cable to the receptacle connector in order to charge the battery.

To avoid such shortcomings, wireless charging devices have been developed to wirelessly charge electronic devices without the need for a charging cord. For example, some electronic devices can be recharged by merely resting on a charging surface of a wireless charging device. A transmitter coil disposed below the charging surface may produce a time-varying magnetic field that induces a current in a corresponding receiving coil in the electronic device. The induced current can be used by the electronic device to charge its internal battery.

Typical wireless charging devices only use a single transmitter coil to perform wireless power transfer. This requires the electronic device to be placed in a very specific position to effectuate power transfer, such as directly above the transmitter coil. Some wireless charging devices use multiple transmitter coils so that an electronic device can be charged over a broad charging surface area. These types of wireless charging devices often have a number of disadvantages. For instance, some wireless charging devices can leak magnetic field into areas of the charging surface where an electronic device is not positioned. This leakage causes heat generation and efficiency losses, which reduce the effectiveness of the wireless charging device. Furthermore, the leaked magnetic field can cause unintended interactions with other devices near or on the charging surface.

SUMMARY

Some embodiments of the disclosure provide shielding structures for a multi-coil wireless charging device that mitigate leakage of magnetic fields across its charging surface. In some embodiments, a shield can be divided into segments by boundary regions. The boundary regions can include material having a magnetic permeability that is lower than a magnetic permeability of the segments so that magnetic fields propagating through the shield will encounter resistance from the boundary regions. Resistance from the boundary regions reduce leakage of magnetic field across the charging surface, thereby minimizing power losses and enhancing power transfer efficiency.

In some embodiments, a wireless charging system includes a shield for redirecting magnetic field generated from a plurality of transmitter coils, the shield including a ferromagnetic structure divided into segments by a plurality of boundary regions, each segment comprises a first material having a first magnetic permeability and each boundary region comprises a second material having a second magnetic permeability lower than the first magnetic permeability, wherein the plurality of boundary regions are configured to resist a propagation of magnetic field from a first area of the ferromagnetic structure to a second area of the ferromagnetic structure, wherein the first area intercepts the magnetic field generated from at least one active transmitter coil of the plurality of transmitter coils.

The plurality of boundary regions can extend across the entire shield from edge to edge. The plurality of boundary regions can intersect one another at a plurality of points. The plurality of points can align with centers of respective transmitter coils. The plurality of boundary regions can include a continuous strip of the second material. The plurality of boundary regions can include a non-continuous strip of the second material. In certain embodiments, the second material includes a dielectric material. In further embodiments, the second material comprises a conductive material. In some embodiments, the second material comprises air. The first area can include a first portion of segments, and the second area can include a second portion of segments. The first area can be a charging area that corresponds to an area of the shield that overlaps the at least one active transmitter coil, and the second area can be a leakage area that overlaps at least one inactive transmitter coil of the plurality of transmitter coils.

In some embodiments, a wireless power transmitting device to transmit magnetic field for wireless power transfer can include a housing having a charging surface, a plurality of transmitter coils disposed within the housing below the charging surface and configured to generate magnetic field during a charging event, and a shield comprising a ferromagnetic structure to redirect at least a portion of the magnetic field generated by the plurality of transmitter coils during the charging event, where the ferromagnetic structure is divided into segments by a plurality of boundary regions, each segment comprises a first material having a first magnetic permeability and each boundary region comprises a second material having a second magnetic permeability lower than the first magnetic permeability.

Each boundary region can be tangent to at least one of the transmitter coils and can bisect at least one other of the transmitter coils. The wireless power transmitting device can further include a driver board disposed below the plurality of transmitter coils. The shield can be disposed between the plurality of transmitter coils and the driver board so that the magnetic field is prevented from exposing on components mounted on the driver board. The shield can include a top side and a bottom side so that the magnetic field enters and exits the shield into and out of the top side. The plurality of boundary regions can be configured to resist a propagation of magnetic field from a first area of the shield to a second area of the shield. The plurality of boundary regions can intersect one another at a plurality of points, where the plurality of points can align with centers of respective transmitter coils. The first area can intercept the magnetic field generated from at least one active transmitter coil of the plurality of transmitter coils. The second material can include a dielectric material.

A better understanding of the nature and advantages of embodiments of the present invention may be gained with reference to the following detailed description and the accompanying drawings.

DETAILED DESCRIPTION

Embodiments of the disclosure describe a shield for a multi-coil wireless charging device that mitigates leakage of magnetic fields across its charging surface. The shield can be housed in an enclosure along with multiple transmitter coils, which are configured to generate time-varying magnetic fields capable of inducing current in a receiver of an electronic device or of a docking station with which the electronic device is coupled. The transmitter coils can be arranged in a manner that enables the multi-coil wireless charging device to provide power to the electronic device positioned anywhere within a broad charging surface. For instance, when the electronic device is placed on only a portion of the charging surface, magnetic fields from the wireless charging device can be confined to areas of the charging surface immediately surrounding the electronic device without leaking to other areas of the charging surface where the electronic device is not positioned. According to embodiments, the shield substantially reduces the leakage of magnetic fields across the charging surface, thereby resulting in improved power transfer efficiency and reduced power losses. Aspects of multi-coil wireless charging devices and shields are discussed in detail further herein.

I. Multi-Coil Wireless Charging Device

Figure 1:
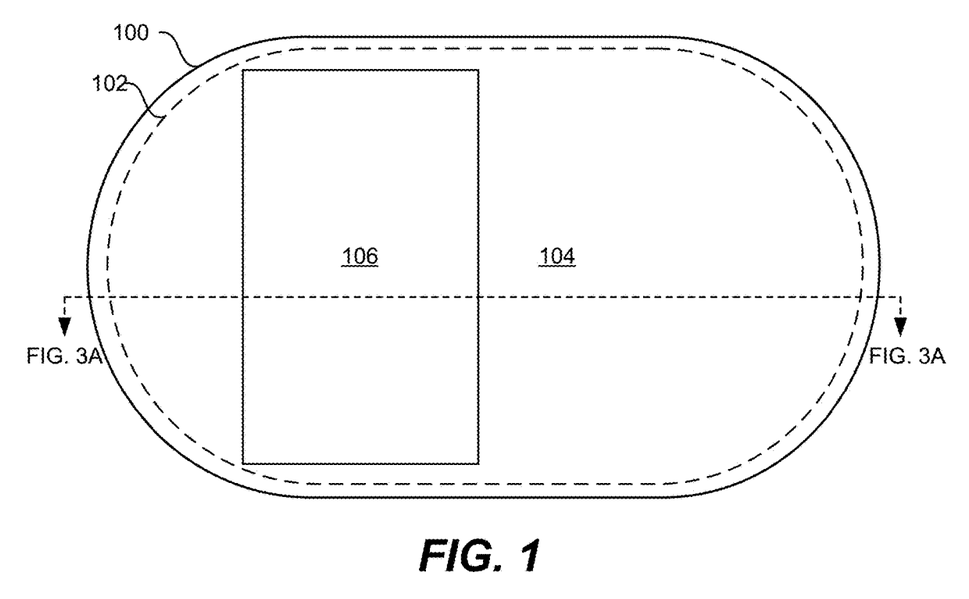
FIG. 1 is a simplified diagram illustrating a wireless charging device configured to perform wireless power transfer.

FIG. 1 illustrates a wireless charging device 100 configured to perform wireless power transfer. Wireless charging device 100 can include a charging surface 102 upon which an electronic device 106 having a wireless power receiver can be placed to wirelessly charge its battery. In some embodiments, charging surface 102 may be a region of a top surface 104 of wireless charging device 100 that spans across a vast majority, if not the entire area, of top surface 104. Time-varying magnetic fields generated by wireless charging device 100 can propagate through regions of top surface 104 within charging surface 102 and form a continuous region within which devices can wirelessly receive power. Time-varying magnetic fields can be generated by multiple transmitter coils embedded within wireless charging device 100. For instance, wireless charging device 100 can include a transmitter coil arrangement as shown in FIG. 2.

Figure 2:
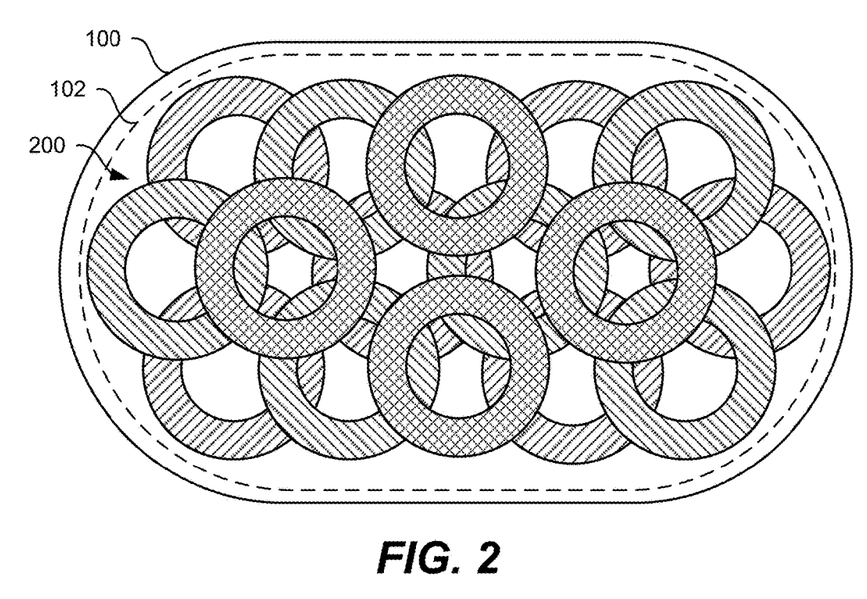
FIG. 2 is a simplified diagram illustrating an exemplary transmitter coil arrangement within a wireless charging device.

FIG. 2 illustrates an exemplary transmitter coil arrangement 200 within wireless charging device 100. The illustration of FIG. 2 shows wireless charging device 100 with top surface 104 removed so that the embedded transmitter coil arrangement 200 may be seen. Transmitter coil arrangement 200 can include multiple arrays of transmitter coils arranged in different layers and in a non-concentric fashion so that when all of the transmitter coils are operating, an array of magnetic fields can be generated across charging surface 102.

Electronic device 106 can be any suitable device configured to receive power from wireless charging device 100. For example, electronic device 106 can be a portable electronic device (e.g., a mobile phone, a media player, an electronic watch, and the like), a docking station, or an accessory electronic device, each having a receiver coil configured to receive power when exposed to magnetic fields produced by wireless charging device 100. When electronic device 106 in FIG. 1, is placed on charging surface 102 of wireless charging device 100, time-varying magnetic fields generated by the transmitter coils can induce a corresponding current in a receiver coil of device 106, as shown in FIG. 3A.

Figure 3A:
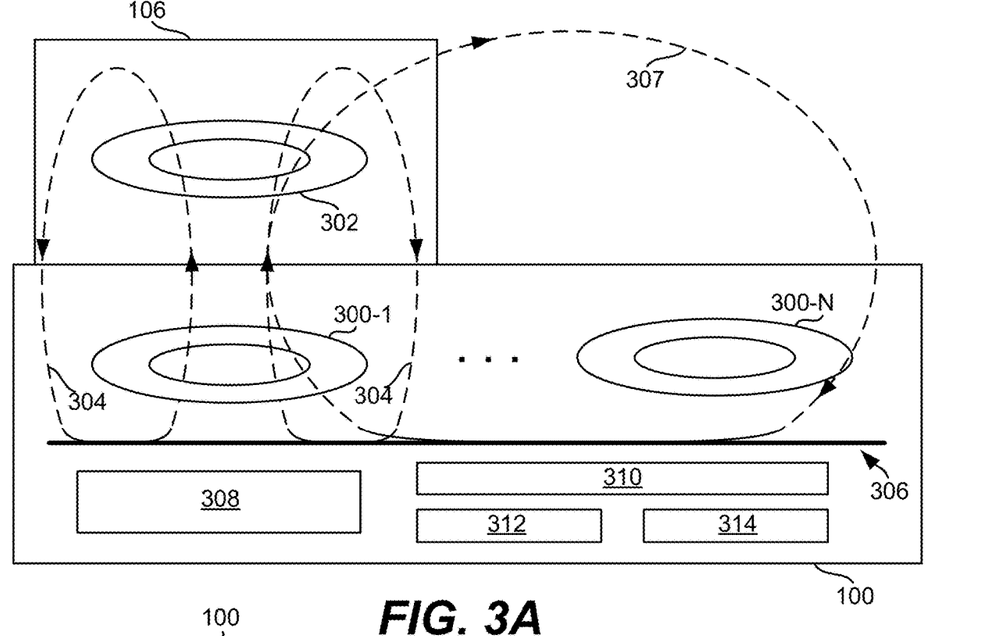
FIG. 3A is a simplified diagram illustrating a simplified cross-sectional view of an electronic device resting on a wireless charging device and the electrical interactions between them during wireless power transfer.

FIG. 3A illustrates a simplified cross-sectional view of electronic device 106 resting on wireless charging device 100 and the electrical interactions between receiver coil 302 and a transmitter coil 300-1 during wireless power transfer.

Transmitter coil 300-1 can be one transmitter coil of a plurality of transmitter coils, such as N number of transmitter coils where transmitter coil 300-N is the $N^{th}$ transmitter coil. Transmitter coils 300-1 to 300-N can be organized as transmitter coil arrangement 200 shown in FIG. 2.

During wireless power transfer, transmitter coil 300-1 can generate time-varying magnetic field 304, which can propagate through both device housings and be received by receiver coil 302. Time-varying magnetic field 304 interacts with receiver coil 302 to generate a corresponding current in receiver coil 302. The generated current can be used to charge a battery for operating electronic device 106.

Although magnetic field 304 can flow towards receiver coil 302, magnetic field 304 can also flow towards other components, e.g., components 308, 310, 312, and 314, within wireless charging device 100, such as control microprocessors, power electronics, and the like. Exposing components 308, 310, 312, and 314 to magnetic field 304 can disturb and compromise the performance of those components. Thus, a shield 306 can be implemented between transmitter coils 300-1 through 300-N and components 308, 310, 312, and 314, as shown in FIG. 3A. Shield 306 can be formed of a material that has a high magnetic permeability, such as ferrite. Shield 306 can thus redirect magnetic field 304 to prevent exposure upon components 308, 310, 312, and 314. Redirection of magnetic field 304 occurs because of the high magnetic permeability of shield 306 when compared to air. Accordingly, magnetic field 304 may prefer to flow into shield 306 instead of flowing out of it. In some instances, magnetic field 304 flows into and out of a first side of shield 306 (i.e., the top side of shield 306 as shown in FIG. 3A) instead of flowing through it and exiting out of a second side of shield 306 (i.e., the bottom side of shield 306 as shown in FIG. 3A). Thus, components 308, 310, 312, and 314 receive minimal, if any, exposure to magnetic field 304.

Typical shields, such as shield 306 in FIG. 3A, are structures formed of a continuous piece of ferromagnetic material. The continuous construction of shield 306 means that its structure is formed of ferromagnetic material throughout its entire build, without any regions of non-ferromagnetic material. For instance, portions of the shield that directly overlap transmitter coils are continuous in construction and do not have regions of non-ferromagnetic material. While this construction effectively shields the magnetic field, its continuous structure also allows magnetic field to propagate across itself and leak out in areas where an electronic device is not positioned. For instance, as shown in FIG. 3A, leaking magnetic field 307 can propagate along shield 306 all the way to an area of shield 306 where electronic device 106 is not positioned. Another perspective of the leakage area is shown in FIG. 3B.

Figure 3B:
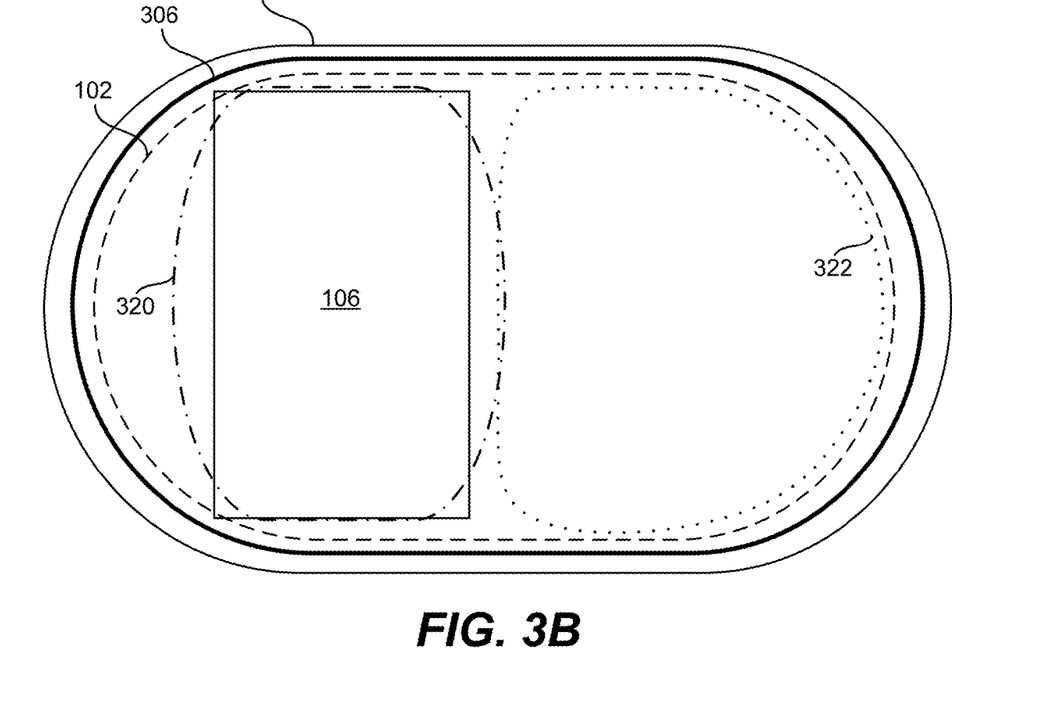
FIG. 3B is a simplified diagram illustrating a simplified top-down view of FIG. 3A.

FIG. 3B illustrates a top-down view of magnetic field leakage when electronic device 106 is positioned on wireless charging device 100 for wireless power transfer. Electronic device 106 can receive power from wireless charging device 100 by merely resting on charging surface 102 of wireless charging device 100. During wireless power transfer, magnetic field 304 is generated by transmitter coil 300-1 and received by receiver coil 302 in electronic device 106, as discussed herein with respect to FIG. 3A. Magnetic field 304 may propagate around the immediate areas surrounding electronic device 106, which is shown as charging area 320. Charging area 320 can also be defined by an area of shield 306 that intercepts magnetic field generated by transmitter coil 300-1. However, given the continuous construction of shield 306, magnetic field 307 can propagate along a length of shield 306 and leak to areas where electronic device 106 is not positioned, such as leakage area 322. It is to be appreciated that charging area 320 and leakage area 322 correspond to areas of shield 306 as well as wireless charging device 100 because a substantial portion of their structures correspond/overlap with each other. Thus, charging area 320 and leakage area 322 are not specific to either shield 306 or wireless charging device 100, but apply to both shield 306 and wireless charging device 100.

This leaked magnetic field can dissipate energy in the form of heat, thereby decreasing the power transfer efficiency of wireless charging device 100. Furthermore, the leaked magnetic field can disturb other electronic devices that are placed on charging surface 102 but not intended and/or not configured to receive charge from wireless charging device 100. This unintended interaction with the leaked magnetic field can damage components in the other electronic devices, such as a radio frequency chip.

Thus, according to some embodiments of the present disclosure, a segmented shield structure is designed to mitigate leakage of magnetic field to areas of the shield where magnetic field is not needed or intended to exist. As will be discussed in more detail further herein, the segmented shield has boundary regions of low permeability that can confine magnetic fields to a charging area, e.g., charging area 320, where an electronic device is receiving charge, and mitigate leakage of magnetic field to areas outside of the charging area, e.g., leakage area 322.

II. Wireless Charging Device with Shielding

Embodiments of the disclosure describe a wireless charging device that has a segmented shield for mitigating leakage of magnetic field across its charging surface. The segmented shield can be formed of a ferromagnetic structure that includes regions of low magnetic permeability. These regions can hinder the propagation of magnetic field across the shield to mitigate leakage of the magnetic field to areas outside of a charging area.

Figure 4A:
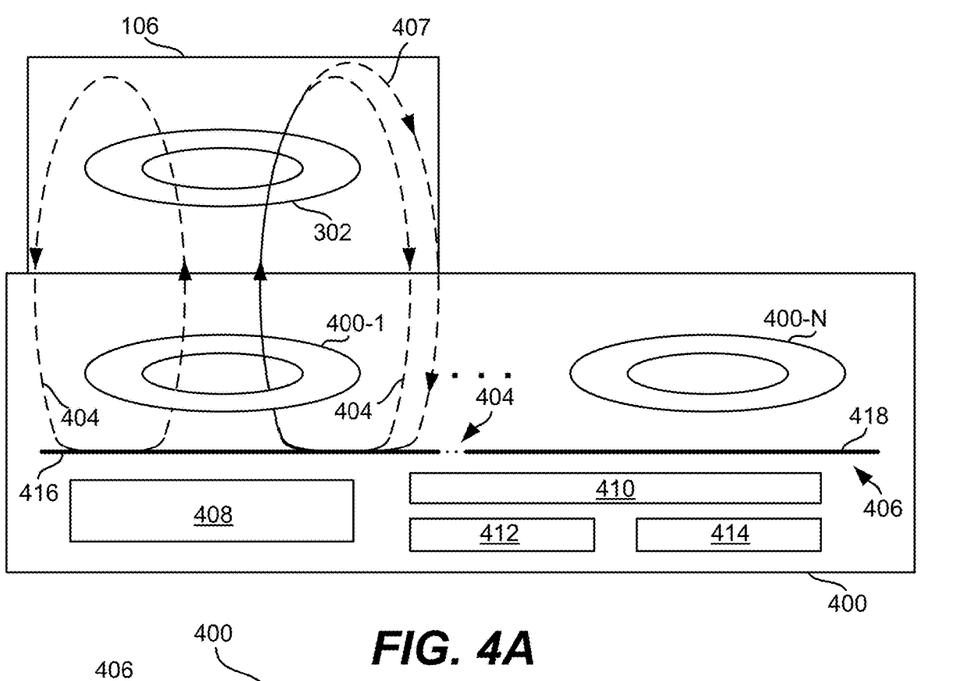
FIG. 4A is a simplified diagram illustrating a simplified cross-sectional view of an electronic device resting on a wireless charging device with a segmented shield and the electrical interactions between them during wireless power transfer, according to some embodiments of the present disclosure.

FIG. 4A illustrates a simplified cross-sectional view of electronic device 106 resting on a wireless charging device 400 that includes a segmented shield 406. Wireless charging device 400 is substantially similar to wireless charging device 100 in FIG. 3A, but different in that wireless charging device 400 includes segmented shield 406 that has boundary regions of low magnetic permeability, according to embodiments of the present disclosure. Thus, the other components shared between wireless charging device 100 and 400 will not be discussed here, and that such details can be referenced in the discussion with respect to FIG. 3A.

During wireless power transfer, transmitter coil 400-1 can generate time-varying magnetic field 404, which can propagate through both device housings and be received by receiver coil 302. Time-varying magnetic field 404 interacts with receiver coil 302 to generate a corresponding current in receiver coil 302. The generated current can be used to charge a battery for operating electronic device 106.

As aforementioned herein, segmented shield 406 can be implemented between transmitter coils 400-1 through 400-N and components 408, 410, 412, and 414, as shown in FIG. 4A, to redirect magnetic field 404 to prevent exposure upon components 408, 410, 412, and 414. Redirection of magnetic field 404 occurs because of the high magnetic permeability of segmented shield 406 when compared to air. Accordingly, magnetic field 404 may prefer to flow into segmented shield 406 instead of flowing out of it. In some instances, magnetic field 404 flows into and out of a first side of segmented shield 406 (i.e., the top side of segmented shield 406 as shown in FIG. 4A) instead of flowing through it and exiting out of a second side of segmented shield 406 (i.e., the bottom side of segmented shield 406 as shown in FIG. 4A). Thus, components 408, 410, 412, and 414 receive minimal, if any, exposure to magnetic field 404.

According to some embodiments of the present disclosure, unlike shield 306 in FIG. 3A, segmented shield 406 can be a structure that is divided into segments by a plurality of boundary regions. For instance, segmented shield 406 can include a boundary region 404 that divides segmented shield 406 into segments 416 and 418. Boundary region 404 can be configured to have low magnetic permeability which allows it to resist and/or obstruct the propagation of magnetic field through certain areas of segmented shield 406. Thus, boundary region 404 can substantially confine magnetic fields generated during wireless power transfer to certain areas of segmented shield 406 and wireless charging device 400. As an example, confined magnetic field 407 can be confined by boundary region 404 so that magnetic field 407 exits out of segmented shield 406 at or near boundary region 404 before it can propagate across the entire segmented shield 406. By resisting and/or obstructing the propagation of magnetic field across segmented shield 406, magnetic fields generated during wireless power transfer can be confined to areas of segmented shield 406 and wireless charging device 400 that immediately surround electronic device 106, thereby minimizing leakage of magnetic fields and enhancing power efficiency.

Figure 4B:
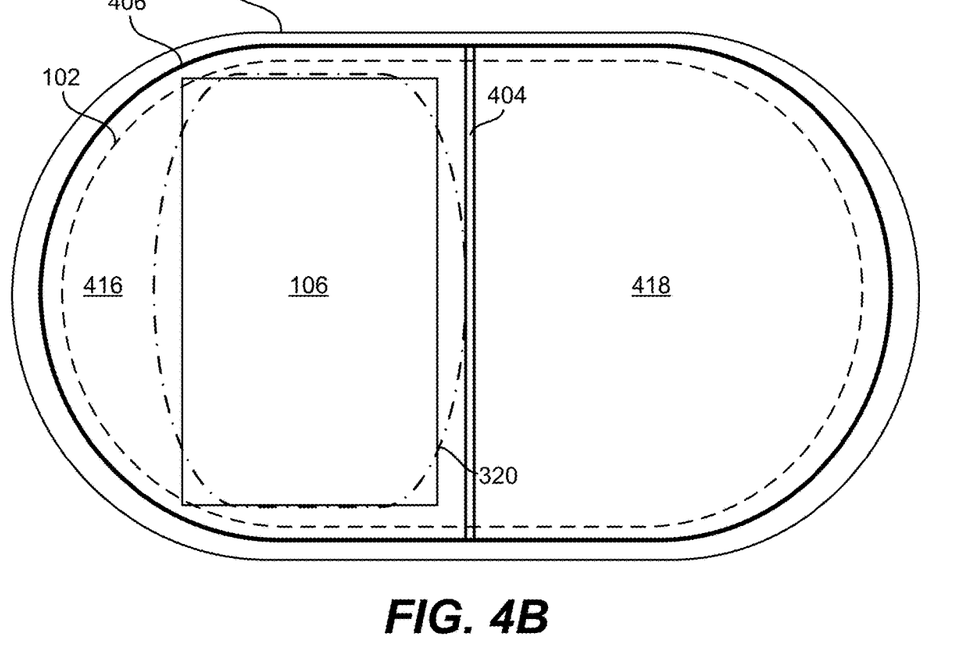
FIG. 4B is a simplified diagram illustrating a simplified top-down view of FIG. 4A, according to some embodiments of the present disclosure.

Another perspective of this concept is shown in FIG. 4B, which illustrates a top-down view of FIG. 4A. By incorporating boundary region 404, magnetic field can be substantially confined to charging area 320, and substantially resisted from leaking to areas outside of charging area 320. For instance, boundary region 404 can confine magnetic fields to propagate within only segment 416 and substantially resist propagation of the magnetic fields to segment 418. Accordingly, segmented shield 406 can mitigate leakage of magnetic field such that a leakage area (e.g., leakage area 322 in FIG. 3B) is not created during wireless power transfer.

As shown in FIG. 4B, boundary region 404 can have a length that is greater than its width so that boundary region 404 has an elongated profile. In some embodiments, boundary region 404 has a length that is a multitude times greater than its width so that boundary region 404 has a build similar to a stripe. Boundary region 404 can extend across at least a portion of segmented shield 406. For instance, boundary region 404 can extend across segmented shield 406 from edge to edge. Furthermore, even though boundary region 404 is shown as a straight line, embodiments are not so limited. Boundary regions in other embodiments can be curved or angled, or be configured to form a polygon. Additionally, boundary regions in other embodiments can be formed of a perforated line so that when viewed generally, boundary region is elongated like a stripe, but when viewed narrowly, boundary region is formed of a plurality of small dots or non-elongated regions of low magnetic permeability that are arranged in a line.

Boundary region 404 can be configured to have a magnetic permeability that is lower than the magnetic permeability of segments 416 and 418. For instance, boundary region 404 can be an air gap. In such instances, each segment 416 and 418 can be individually fixed in position, such as with an adhesive or with one or more bridging structures that attach neighboring segments with one another, as will be discussed further herein.

In some additional and alternative embodiments, boundary region 404 can be formed of a diamagnetic material that has non-conductive properties and structural rigidity, unlike an air gap. For instance, boundary region 404 can be formed of a dielectric material that has a high dielectric breakdown voltage such as epoxy resin, polytetrafluoroethylene (PTFE), high density polyethylene (HDPE), and the like. The type of material used to form boundary region 404 can also have properties that minimize interference during device operation, such as materials with low radio frequency (RF) loss (which include the materials listed herein). By using a material that has structural rigidity, segmented shield 400 can have a structural composition like a solid continuous shield structure, but have electrical properties reflective of a segmented structure.

Furthermore, boundary region 404 can be formed of a diamagnetic material that has conductive properties. As an example, boundary region 404 can be formed of copper, or any other conductive material that has a relative permeability of at least −1.0.

A. Boundary Region Configurations

Figure 5A:
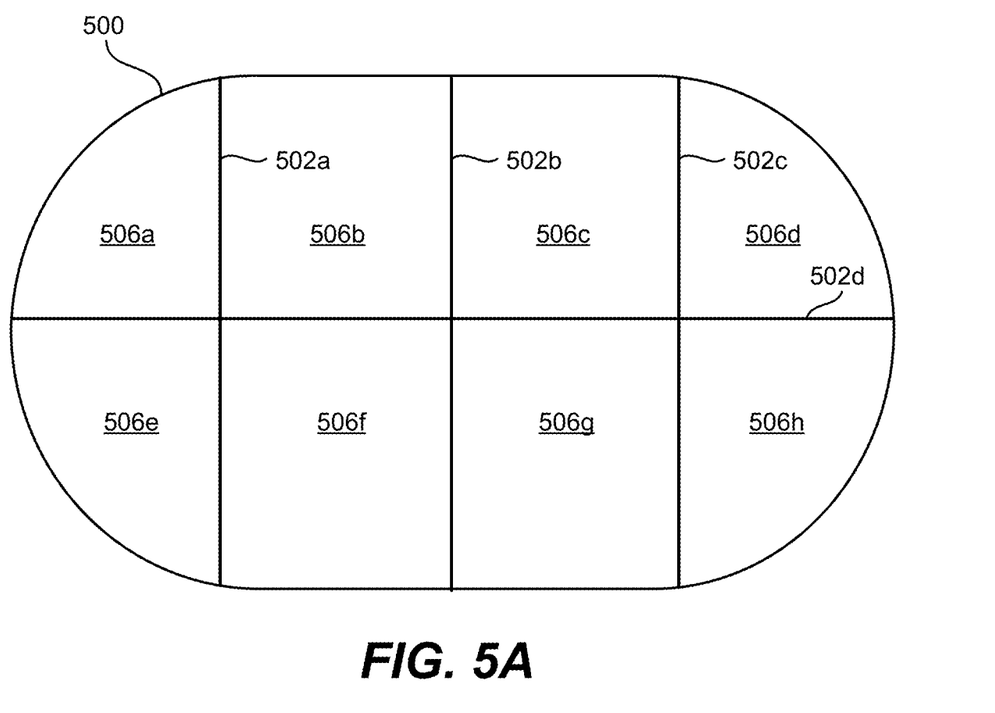
FIG. 5A is a simplified diagram illustrating an exemplary segmented shield having a plurality of boundary regions in a first configuration that divide the segmented shield into segments, according to some embodiments of the present disclosure.

Although FIGS. 4A and 4B illustrate segmented shield 406 as having only one boundary region, segmented shield 406 can include a plurality of boundary regions, according to some embodiments of the present disclosure. For instance, FIG. 5A illustrates an exemplary segmented shield 500 having a plurality of boundary regions 502a-d that divide segmented shield 500 into segments 506a-h. Boundary regions 502a-c can be vertically oriented, and boundary region 502d can be horizontally oriented to divide segmented shield 500 into a plurality of rectangular segments 506a-h. During wireless power transfer, boundary regions 502a-d can substantially mitigate propagation of magnetic field across segmented shield 500, and thus help confine magnetic field to certain areas of segmented shield 500. In some embodiments, magnetic field can be substantially confined within segment 506b, or the magnetic field can be confined within segments 506b and 506c if active transmitter coil(s) are overlapped by both segments 506b and 506c such that the transmitter coil(s) emit magnetic field in segments 506b and 506c. Although boundary regions 502a-d are shown as solid lines, it is to be appreciated that boundary regions 502a-d have a width dimension.

The degree at which boundary regions 502a-d resist the propagation of magnetic fields across its region can vary depending on their widths. Wider boundary regions have larger effective resistances against propagation of magnetic field. Conversely, narrower boundary regions have smaller resistances. However, adjusting the width can affect the total inductance of the multi-coil array. For instance, wider boundary regions decrease the total inductance, while narrower boundary regions increase the total inductance. Thus, the width of boundary regions 502a-d can be tuned specifically to the amount of resistance and inductance desired. In some embodiments, the width of boundary regions 502a-d can range between 1 and 5 mm.

Figure 5B:
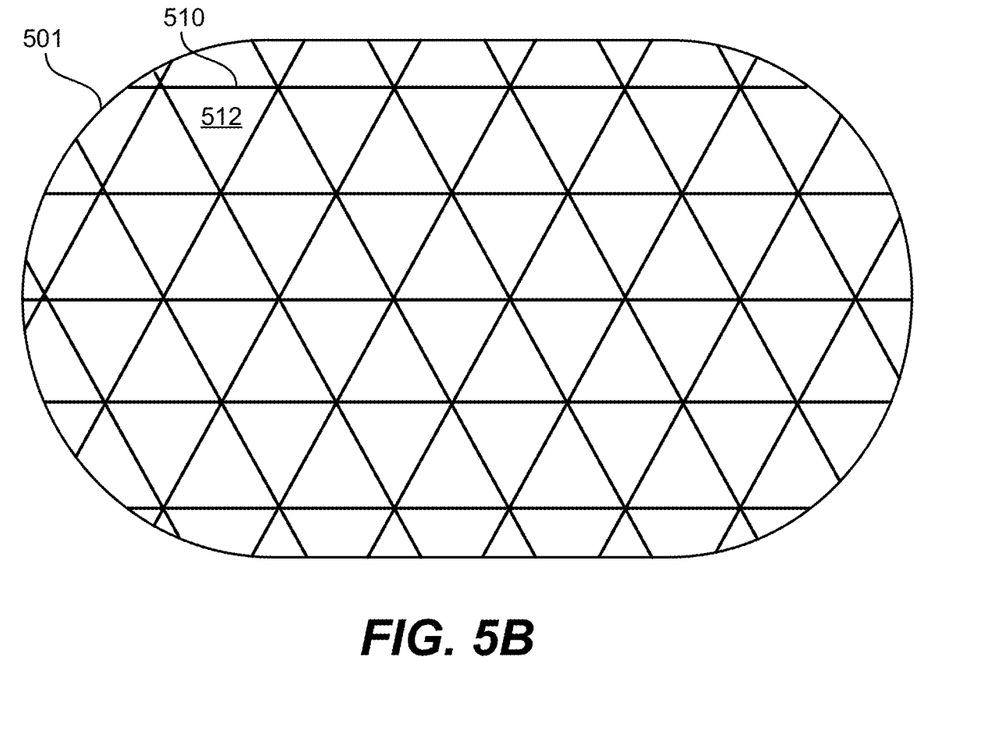
FIG. 5B is a simplified diagram illustrating an exemplary segmented shield having a plurality of boundary regions in a second configuration that divide the segmented shield into segments, according to some embodiments of the present disclosure

The configuration shown in FIG. 5A is merely exemplary and not intended to be limiting. That is, other embodiments can have more or less boundary regions that divide a segmented shield into more or less than the number shown in FIG. 5A. Furthermore, boundary regions do not have to be oriented in strictly vertical and horizontal orientations; rather, boundary regions can be oriented in any configuration. For example, FIG. 5B illustrates an exemplary segmented shield 501 divided into segments 512 by boundary regions 510 that include diagonally oriented boundary regions. Letter designations are not assigned in FIG. 5B for clarity purposes given the large number of boundary regions and segments. Boundary regions 510 can include diagonal and horizontal boundary regions that form triangular segments 512. In some embodiments, each boundary region can extend across the entire segmented shield 501 from edge to edge. It is to be appreciated that the configuration of boundary regions, segments, and boundary region orientations can vary by design. For instance, the configuration can be designed according to an array of transmitter coils positioned adjacent to the segmented shield. As an example, boundary regions 510 can be configured according to a multi-coil array of transmitter coils, as will be discussed in further detail herein.

Figure 6A:
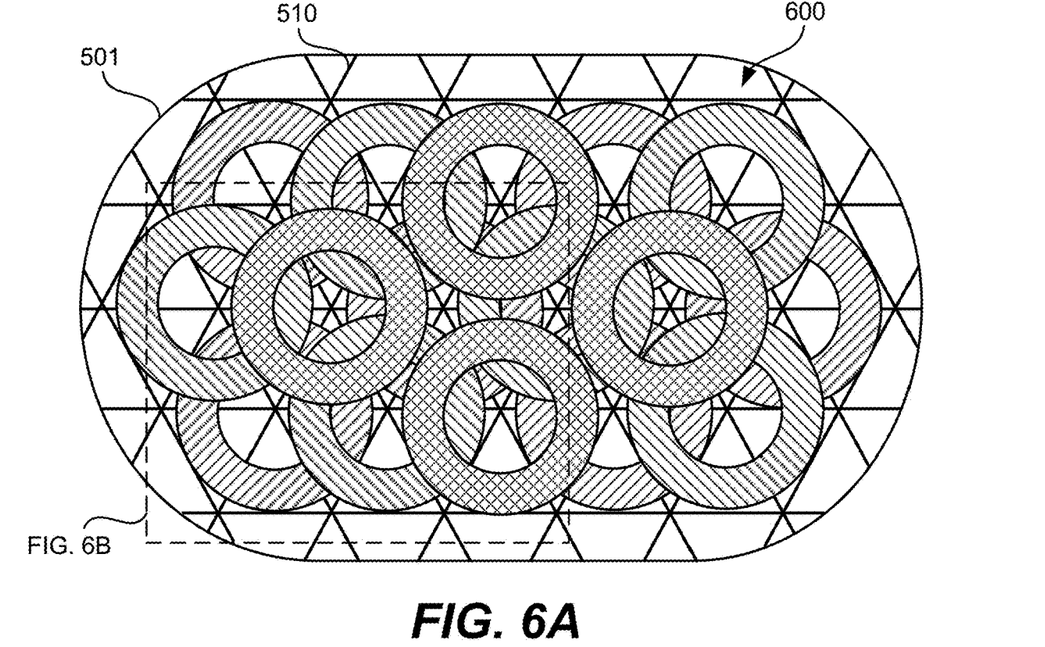
FIG. 6A is a simplified diagram illustrating a multi-coil array superimposed over the segmented shield shown in FIG. 5B, according to some embodiments of the present disclosure.

FIG. 6A illustrates a multi-coil array 600 superimposed over segmented shield 501, according to some embodiments of the present disclosure. Multi-coil array 600 can be arranged to maximize a charging surface of a wireless charging device, as discussed herein with respect to FIG. 2. Boundary regions 510 can be positioned to confine magnetic fields generated by one or more transmitter coils so that if some transmitter coils are activated in only one area of the wireless charging device, magnetic fields do not substantially leak across to other areas of the charging surface, as discussed herein with respect to FIGS. 4A and 4B. The configuration of the boundary regions are discussed in further detail in FIG. 6B.

Figure 6B:
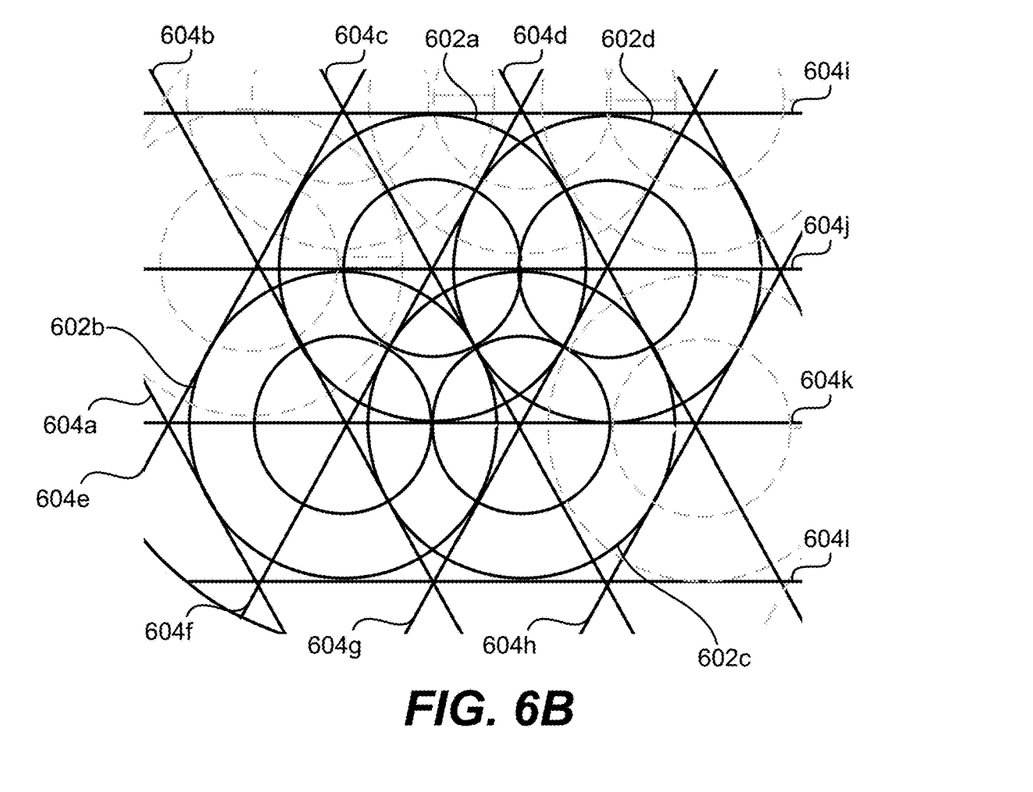
FIG. 6B is a simplified diagram illustrating a zoomed-in top-down view of transmitter coils in the multi-coil array of FIG. 6A superimposed over the segmented shield shown in FIG. 5B, according to some embodiments of the present disclosure

FIG. 6B illustrates a zoomed-in top-down view of transmitter coils 602a-d in multi-coil array 600 superimposed over segmented shield 501 having boundary regions 510 that include boundary regions 604a-1, according to some embodiments of the present disclosure. Other transmitter coils are faded and drawn with dotted lines to indicate their location without detracting from the focus on transmitter coils 602a-d and boundary regions 604a-1, which are drawn with solid lines.

As shown in FIG. 6B, boundary regions 604a-1 can be arranged so that each boundary region is positioned tangential to at least one transmitter coil while also positioned through the center of at least one other transmitter coil. For instance, boundary region 604c is positioned tangential to transmitter coils 602b and 602d while also positioned through the center of transmitter coils 602a and 602c. All boundary regions of a segmented shield can be arranged in this manner so that as a whole, each transmitter coil is bisected by one or more boundary regions and has one or more other boundary regions that are tangential to it. As an example, transmitter coil 602a is bisected by boundary regions 604c, 604f, and 604j, and has boundary regions 604i, 604d, 604g, 604k, 604b, and 604e (recited in a clockwise fashion) that are positioned tangential to it. The nature of this configuration results in a segmented shield design where bisecting boundary regions intersect at the center of each transmitter coil, and tangential boundary regions are positioned around each transmitter coil and effectively form a perimeter around each transmitter coil.

This arrangement is designed to maximize resistance against propagation of magnetic field between transmitter coils (i.e., mitigate leakage), but minimize interference with the magnetic field generated within each transmitter coil (i.e., maximize inductance of the transmitter coils). As mentioned herein, bisecting boundary regions intersect at the center of a transmitter coil. Given that an active transmitter coil generates a magnetic field that emanates radially to/from the center of the active transmitter coil, bisecting boundary regions are positioned parallel to the propagation of generated magnetic fields. Accordingly, bisecting magnetic fields do not significantly interfere with the generated magnetic fields. On the other hand, tangential boundary regions are positioned substantially perpendicular to the radial direction of generated magnetic fields. Thus, tangential boundary regions can substantially interfere and resist the propagation of magnetic field across the tangential boundary regions. As a result, the tangential boundary regions can effectively form a perimeter of low magnetic permeability to confine the generated magnetic field to areas immediately surrounding the active transmitter coil, thereby forming a charging area over the active transmitter coil. For instance, if continuing with the example with respect to transmitter coil 602a, bisecting boundary regions 604c, 604f, and 604j are positioned parallel to magnetic field generated by transmitter coil 602a, and tangential boundary regions 604i, 604d, 604g, 604k, 604b, and 604e are positioned perpendicular to the magnetic field generated by transmitter coil 602a. The charging area is then defined as a hexagonal shape formed by the tangential boundary regions surrounding transmitter coil 602a.

A charging area is not limited to the area over one transmitter coil; rather, the size and shape of the charging area is defined by the number and arrangement of active transmitter coils. Larger groups of active transmitter coils result in a larger charging areas that correspond to the size and shape of the arrangement of the active transmitter coils. For instance, if transmitter coils 602a and 602b are active, then the charging area can be defined by boundary regions 604i, 604d, 604g, 604l, 604a, and 604e (recited in clockwise order). Thus, when transmitter coils 602a and 602b are active during wireless power transfer, magnetic fields generated by transmitter coils 602a and 602b can be substantially confined within that charging area, and magnetic field can be substantially prevented from leaking out of that charging area, thereby avoiding excessive heating from leaked magnetic fields and resulting in a loss of power efficiency.

It is to be appreciated that the image shown in FIG. 6B shows transmitter coils superimposed over boundary regions 604a-1. Thus, descriptions regarding intersection and the like are not intended to mean that the boundary regions and the transmitter coils are actually in physical contact with one another. Rather, the discussion pertains to their position relative to one another. One skilled in the art understands that the transmitter coils and the boundary regions of the segmented shield are positioned in separate layers of a wireless charging device. Furthermore, although not specifically labeled for clarity purposes, segments of shield 500 are understood to be the areas delineated by boundary regions 604a-1. For instance, segments of shield 500 in FIG. 6B have a triangular shape and are oriented such that six triangular segments are positioned over each transmitter coil.

As shown in FIGS. 4B, 5A-B, and 6A-B, boundary regions can be configured to have low magnetic permeability continuously across its entire length. However, such embodiments are not intended to be limiting, and that other embodiments can have boundary regions that do not have low magnetic permeability continuously across its entire length. For instance, forming a boundary region with an air gap can result in a segment that is freely movable unless it is fixed to a static structure. Thus, in some embodiments, segments can be fixed in place by configuring the boundary regions with one or more bridging structures as shown in FIG. 7A.

Figure 7A:
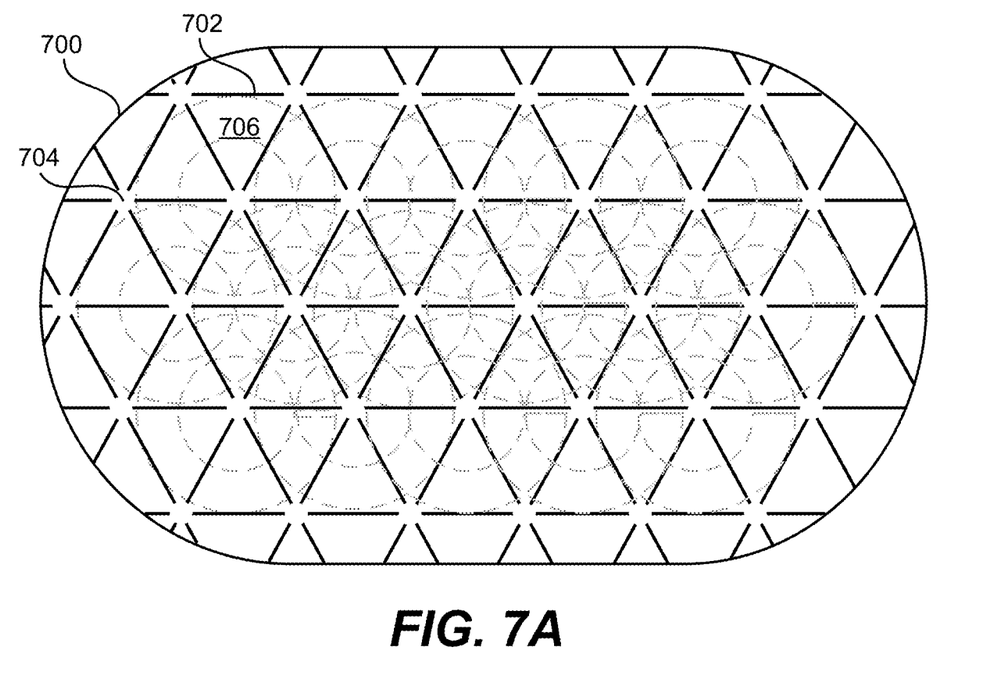
FIG. 7A is a simplified diagram illustrating an exemplary segmented shield that has boundary regions that are configured with bridging structures between segments, according to some embodiments of the present disclosure.

FIG. 7A illustrates an exemplary segmented shield 700 that has boundary regions 702 that are configured with bridging structures 704 between segments 706, according to some embodiments of the present disclosure. These bridging structures can be extensions of segments 706 that bridge with neighboring segments to connect them together. Since bridging structures 704 are extensions of segments 706, bridging structures 704 can be formed of the material as segments 706, which is formed of a material having high magnetic permeability. Accordingly, instead of being a continuous strip, boundary regions 702 can be a dashed strip that includes sections of low magnetic permeability and high magnetic permeability. It is to be appreciated that boundary regions 702 do not have to include air as the low magnetic permeability component. Rather, the dashed strip configuration can apply to other types of boundary regions, such as boundary regions formed with a dielectric material or a conductive material discussed herein.

Figure 7B:
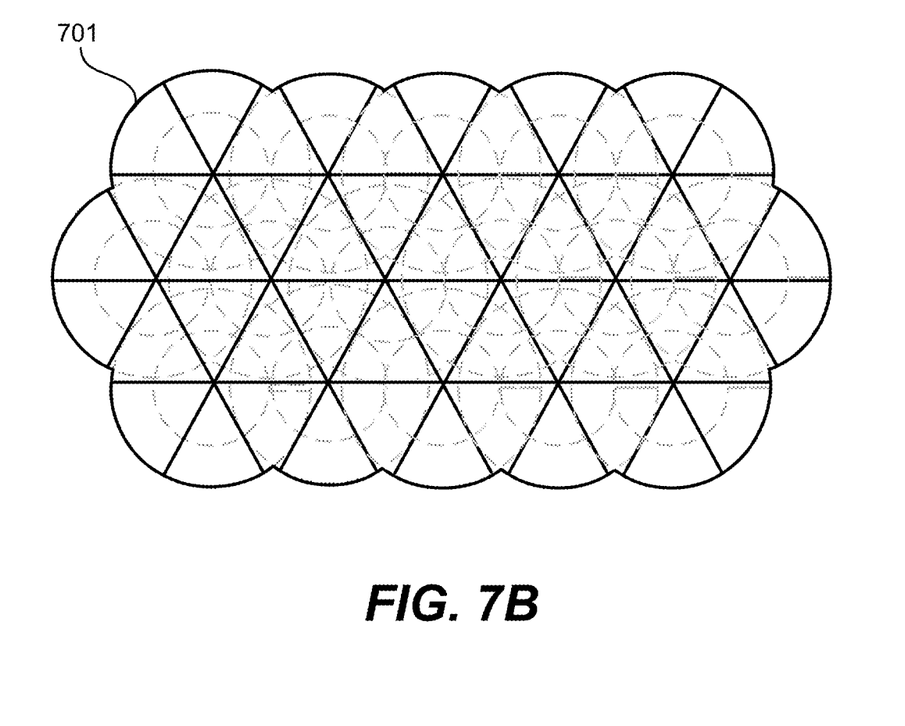
FIG. 7B is a simplified diagram illustrating an exemplary segmented shield having an outer profile that corresponds to the outer profile of a multi-coil array configured in the transmitter coil arrangement shown in FIG. 2, according to some embodiments of the present disclosure

As shown in FIGS. 3B, 4B, 5A-B, 6A, and 7A, the outer profile of a segmented shield can correspond to the outer profile of a wireless charging device; however, embodiments are not so limited. As an example, some embodiment can have outer borders that follow the profile of a multi-coil array, as shown in FIG. 7B, which illustrates an exemplary segmented shield 701 having an outer profile that corresponds to the outer profile of a multi-coil array configured in the transmitter coil arrangement discussed herein with respect to FIG. 2, according to some embodiments of the present disclosure. Forming a segmented shield this way can reduce the amount of ferrite needed to manufacture segmented shield 701. Reducing the amount of ferrite used to form the shield can save cost.

III. Wireless Charging Device with Segmented Shielding

Figure 8:
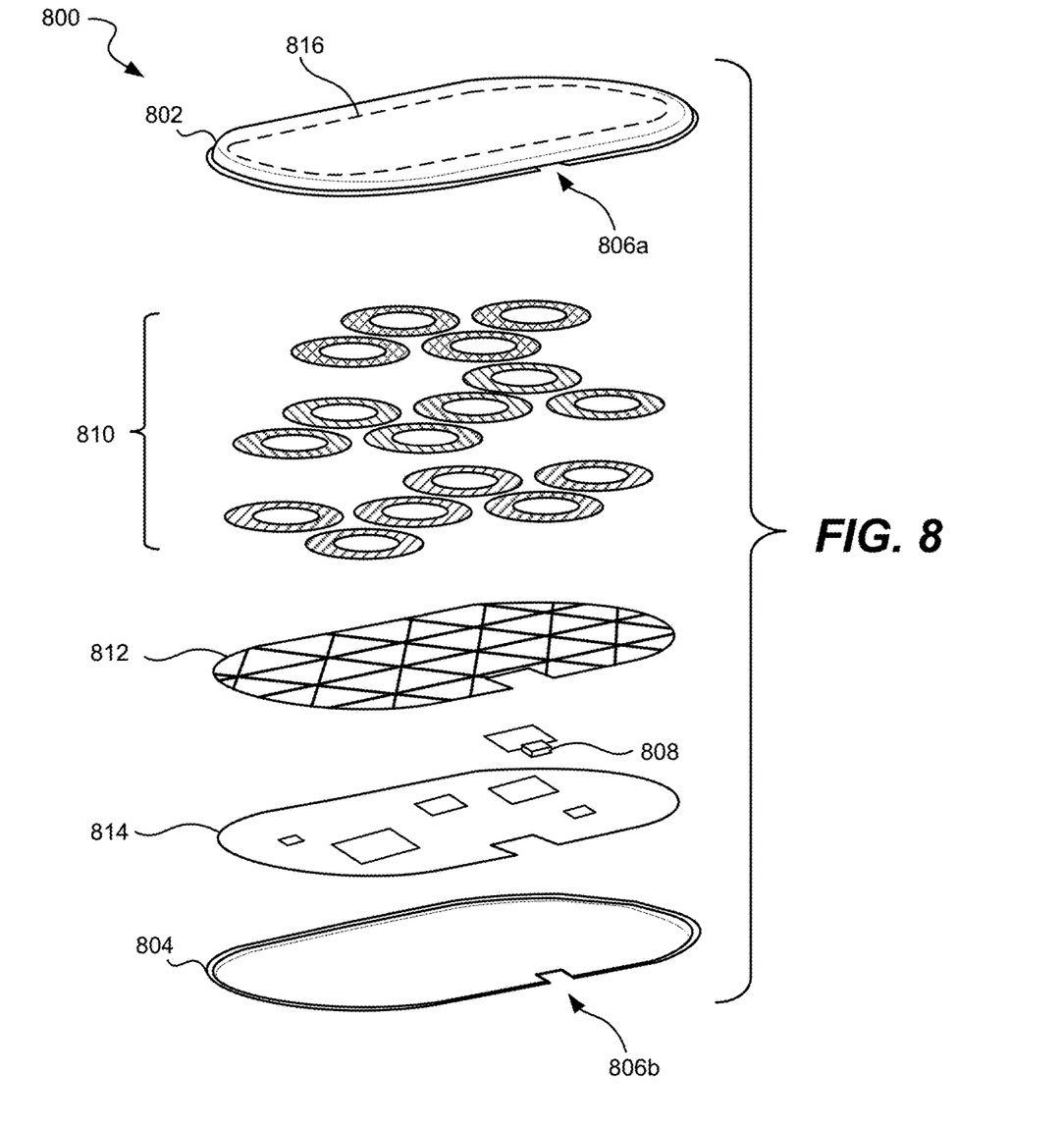
FIG. 8 is a simplified diagram illustrating a simplified, exploded view of an exemplary wireless charging device having a segmented shield, according to some embodiments of the present disclosure.

FIG. 8 illustrates a simplified, exploded view of an exemplary wireless charging device 800 having a segmented shield 812, according to some embodiments of the present disclosure. Wireless charging device 800 can include a housing formed of two shells: a first shell 802 and a second shell 804. First shell 802 can mate with second shell 804 to form an interior cavity within which internal components may be positioned. First and second shells 802 and 804 can also include notches 806a and 806b, respectively, that form an opening within the housing when first and second shells 802 and 804 are mated. An electrical connector 808, such as a receptacle connector, can be positioned within the opening so that wireless charging device 800 can receive power from an external power source through a cable connected to electrical connector 808. In some embodiments, electrical connector 808 may include a plurality of contact pins and a plurality of terminals electrically coupled to the contact pins so that power can be routed from the external power source to driver board 810 to provide power for wireless power transfer.

The interior cavity formed between mated first and second shells 802 and 804 can include components that generate the magnetic field for performing the wireless charging of an electronic device. As an example, an array of transmitter coils 810 can be housed within the inner cavity. Transmitter coils 810 can be operated to generate time-varying magnetic fields that propagate above the top surface of top shell 802 during wireless power transfer. The arrangement of transmitter coils 810 can form a charging surface 816 on to shell 802 within which an electronic device can be placed to receive power from wireless charging device 800. The electronic device can be placed in any area of the charging surface to receive power.

In addition to transmitter coils 810, wireless charging device 800 can also include a segmented shield 812 according to some embodiments of the present disclosure. Segmented shield 812 can be configured to prevent exposure of magnetic field upon electrical components within wireless charging device 800 and mitigate leakage of magnetic field across it structure, as discussed herein with respect to FIGS. 4A-B. Accordingly, segmented shield 812 can be positioned within wireless charging device 800 in a suitable location for blocking magnetic field from exposing on components within wireless charging device 800. For example, segmented shield 812 can be positioned between transmitter coils 810 and a driver board 814 that houses the components within wireless charging device 800.

Implementing segmented shield 812 prevents magnetic field from exposing on sensitive electronic components with wireless charging device 800 and mitigates leakage of magnetic field across charging surface 816 to areas where no electronic device is positioned on charging surface 816. Preventing leakage of magnetic fields can minimize unnecessary device heating and power losses, thereby enhancing power transfer efficiency.

Although the invention has been described with respect to specific embodiments, it will be appreciated that the invention is intended to cover all modifications and equivalents within the scope of the following claims.

What is claimed is:

1. A wireless power transmitting device to transmit magnetic fields for wireless power transfer, the wireless power transmitting device comprising:
   a housing having a charging surface;
   a plurality of overlapping transmitter coils disposed within the housing below the charging surface and configured to generate magnetic fields during a charging event; and
   a shield disposed below the plurality of overlapping transmitter coils, the shield comprising a ferromagnetic structure divided into a plurality of segments of uniform size and shape by a plurality of regularly-spaced boundary regions, each segment made of a first material having a first magnetic permeability and each boundary region made of a second material having a second magnetic permeability lower than the first magnetic permeability such that each boundary region resists propagation of a magnetic field between segments on either side of the boundary region, wherein the segments are oriented such that a plurality of segments are positioned below each transmitter coil, and
   wherein the boundary regions are arranged such that each boundary region is tangential to a first one of the overlapping transmitter coils and radial to a second one of the overlapping transmitter coils that overlaps with the first one of the overlapping transmitter coils.

2. The wireless power transmitting device of claim 1, further comprising a driver board disposed below the plurality of overlapping transmitter coils.

3. The wireless power transmitting device of claim 2, wherein the shield is disposed between the plurality of overlapping transmitter coils and the driver board.

4. The wireless power transmitting device of claim 3, wherein the shield has a top side and a bottom side and the magnetic fields generated by the plurality of overlapping transmitter coils enter and exit the shield into and out of the top side.

5. The wireless power transmitting device of claim 1, wherein the plurality of boundary regions intersect one another at a plurality of intersection points.

6. The wireless power transmitting device of claim 5, wherein at least some of the plurality of intersection points align with centers of the transmitter coils.

7. The wireless power transmitting device of claim 1, wherein one or more of the segments intercept the magnetic fields generated by at least one active transmitter coil of the plurality of overlapping transmitter coils.

8. The wireless power transmitting device of claim 1, wherein the second material comprises a dielectric material.

9. The wireless power transmitting device of claim 1, wherein the first material comprises ferrite.

10. The wireless power transmitting device of claim 1, wherein the segments are triangular.

11. The wireless power transmitting device of claim 10, wherein the triangular segments are oriented such that six triangular segments are positioned over below each transmitter coil.

12. A shield for redirecting magnetic field generated from a plurality of overlapping transmitter coils, the shield comprising:
a ferromagnetic structure divided into a plurality of segments of uniform size and shape by a plurality of regularly-spaced boundary regions, each segment made of a first material having a first magnetic permeability and each boundary region made of a second material having a second magnetic permeability lower than the first magnetic permeability such that each boundary region resists propagation of a magnetic field between segments on either side of the boundary region, wherein the segments are oriented such that a plurality of segments are positioned below each transmitter coil, and
wherein the boundary regions are arranged such that each boundary region is tangential to at least a first one of the overlapping transmitter coils and radial to at least a second one of the overlapping transmitter coils.

13. The shield of claim 12, wherein the plurality of boundary regions intersect one another at a plurality of intersection points.

14. The shield of claim 13, wherein at least some of the plurality of intersection points align with centers of the transmitter coils.

15. The shield of claim 12, wherein the plurality of boundary regions comprise continuous strips of the second material that extend across the shield from edge to edge.

16. The shield of claim 12, wherein the second material comprises a dielectric material.

17. The shield of claim 12, wherein the second material comprises a conductive material.

18. The shield of claim 12, wherein the second material comprises air.

19. The shield of claim 12, wherein the first material comprises ferrite.

20. The shield of claim 12, wherein the segments are triangular.

* * * * *